United States Patent
Su et al.

(10) Patent No.: US 10,139,871 B2
(45) Date of Patent: Nov. 27, 2018

(54) ELECTRONIC DEVICE WITH CIRCUIT PROTECTION AND ASSEMBLING METHOD THEREOF

(71) Applicant: Wistron Corporation, New Taipei (TW)

(72) Inventors: Yu-Sheng Su, New Taipei (TW); Yin-Teng Hsieh, New Taipei (TW)

(73) Assignee: Wistron Corporation, New Taipei (TW)

( * ) Notice: Subject to any disclaimer, the term of this patent is extended or adjusted under 35 U.S.C. 154(b) by 105 days.

(21) Appl. No.: 14/740,265

(22) Filed: Jun. 16, 2015

(65) Prior Publication Data
US 2016/0204594 A1 Jul. 14, 2016

(30) Foreign Application Priority Data

Jan. 14, 2015 (TW) .............................. 104101193 A

(51) Int. Cl.
G06F 1/18 (2006.01)
G06F 1/16 (2006.01)
H04M 1/02 (2006.01)

(52) U.S. Cl.
CPC ............ G06F 1/182 (2013.01); G06F 1/1635 (2013.01); H04M 1/026 (2013.01); H04M 1/0249 (2013.01)

(58) Field of Classification Search
USPC ...................................... 361/93.1, 93.7–93.9
See application file for complete search history.

(56) References Cited

U.S. PATENT DOCUMENTS

| 5,228,084 A * | 7/1993 | Johnson ............. G06Q 20/3829 705/71 |
| 5,610,493 A * | 3/1997 | Wieloch ................ H02M 7/003 318/801 |
| 6,310,753 B1 * | 10/2001 | Dollar, II ................. H02H 1/06 361/102 |
| 2006/0232942 A1* | 10/2006 | Nakatsu .................. B60L 11/08 361/710 |
| 2010/0073113 A1* | 3/2010 | Yang .................... H01H 71/123 335/15 |
| 2010/0079956 A1* | 4/2010 | Ibori ...................... H02M 7/003 361/703 |
| 2011/0297518 A1* | 12/2011 | Baujan ............... H01H 71/7409 200/17 R |

FOREIGN PATENT DOCUMENTS

TW 200825659 6/2008

* cited by examiner

Primary Examiner — Danny Nguyen
(74) Attorney, Agent, or Firm — JCIPRNET

(57) ABSTRACT

An electronic device with circuit protection including a body, an assembling unit, and a first electronic module, a control unit and a circuit protection unit disposed in the body is provided. The control unit is electrically connected to the first electronic module and the circuit protection unit. The assembling unit is detachably assembled onto the circuit protection unit and electrically connected thereto. A trigger signal is transmitted to the control unit while the assembling unit and the circuit protection unit being electrically connected with each other, such that states of the first assembling unit is changed by the control unit. An assembling method of the electronic device with circuit protection is also provided.

14 Claims, 4 Drawing Sheets

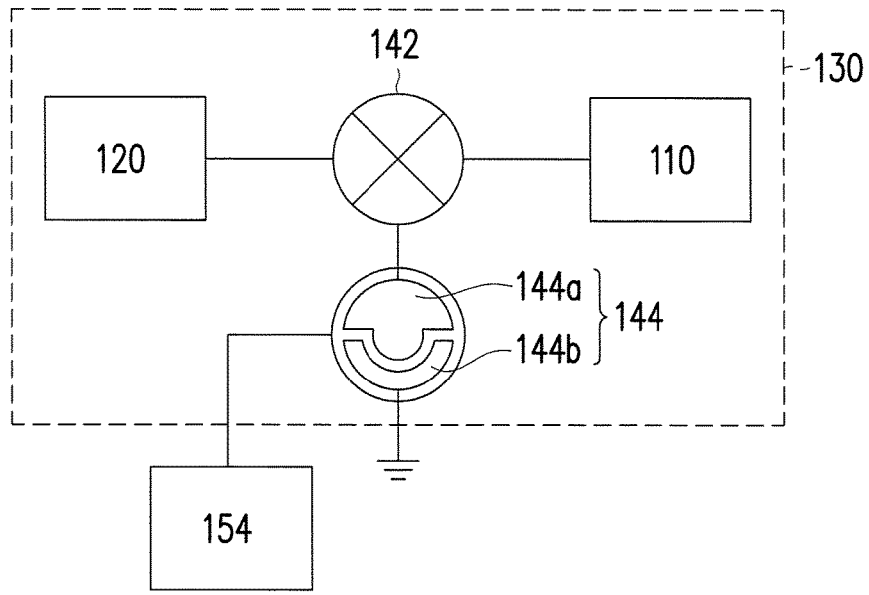

FIG. 2

| Assemble the first electronic module and the second electronic module to the first casing of the body by the second assembling units respectively, wherein the electrical connection between the first electronic module and the second electronic module is cut-off by the control unit. | ~S310 |

| Assemble and fix the first casing and the second casing together by the first assembling unit, and the circuit protection unit on the circuit board is electrically conducting through the first assembling unit screwed thereto, such that a trigger signal is sent to the control unit and the control unit turns on the electricalconnection between the first electronic module and the second electronic module. | ~S320 |

FIG. 3

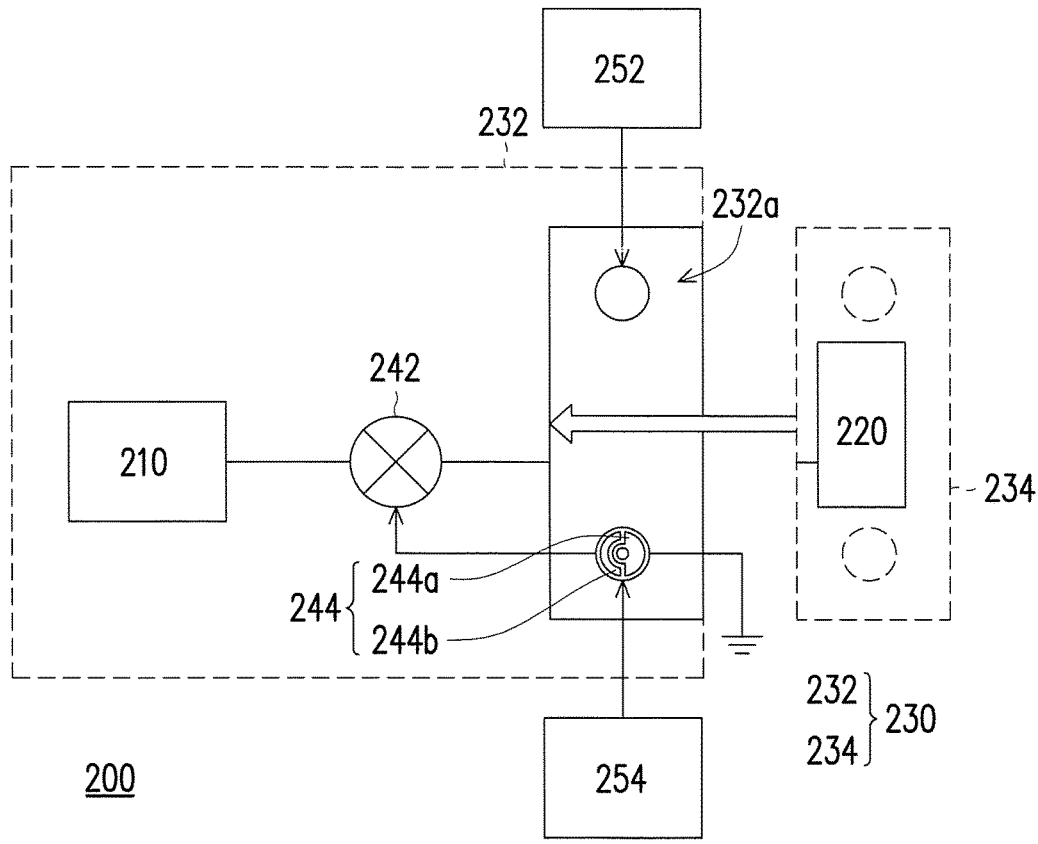

FIG. 4

| The second casing is assembled to the first casing by the second assembling unit, such that the control module is electrically connected to the second electronic module is the control module and turns of the electrical connection between the first electronic module and the second electronic module. | ~S510 |

| Assemble and fix the first casing and the second casing together by the first assembling unit, and the first assembling unit is assembled to and electrically conducting the circuit protection unitcircuit protection unit, such that the control unit turns on the electrical connection between the first electronic module and the second electronic module. | ~S520 |

FIG. 5

ELECTRONIC DEVICE WITH CIRCUIT PROTECTION AND ASSEMBLING METHOD THEREOF

CROSS-REFERENCE TO RELATED APPLICATION

This application claims the priority benefit of Taiwan application serial no. 104101193, filed on Jan. 14, 2015. The entirety of the above-mentioned patent application is hereby incorporated by reference herein and made a part of this specification.

BACKGROUND OF THE INVENTION

1. Field of the Invention

The disclosure relates to an electronic device with circuit protection and an assembling method thereof.

2. Description of Related Art

With rapid developments in technology, portable electronic devices such as tablet PCs or smart phones and the like have been widely used due to its advantages that allow users to carry it on their body and operate easily.

However, in a manufacturing process of a portable electronic device, when a power module thereof, such as a battery, is installed, then the subsequent assembly environment of the electronic unit is in a powered state (namely a live-line operation), therefore causing the electronic unit to often times be damaged during the instance when assembling the electronic unit due to excessive electrical current passing through. Furthermore, the power module is not the last component that is assembled in the assembly process, therefore the above mentioned situation can not be improved effectively.

A similar situation arises in currently available hot swapping expansion devices, namely during a process when the expansion device is assembled to the main device, the electrical connection terminals thereof may not be completely connected accurately in an instant, and there remains in the process a situation where the electrical connection terminals may cause the above mentioned electrical conduction errors due to a misconnection.

In this way, how to ensure that the conduction path of the power source does not pass through the structural components prior to the completion of the assembly of the structural components, namely performing the electrical connection process after the structural connections have been completed, is a problem worth considering and solved.

SUMMARY OF THE INVENTION

The disclosure provides an electronic device with circuit protection and an assembling method thereof, which uses whether an assembly unit and a circuit protection unit is assembled or not as a basis for changing a state of an electronic module.

The disclosure provides an electronic device with circuit protection including a body, an assembly unit, a first electronic module, a control unit and a circuit protection unit disposed at the body. The control unit is electrically connected to the first electronic module and the circuit protection unit. The assembling unit is electrically connected and detachably assembled onto the circuit protection unit of the body. The circuit protection unit provides a trigger signal to the control unit after being electrically conducted, such that the control unit changes the first electronic module in different states.

The disclosure provides an assembling method for an electronic device with circuit protection, the electronic device includes a body, a first electronic module, a second electronic module, a first assembling unit, a plurality of second assembling units, a control unit and a circuit protection unit, the method for assembling the electronic device comprising, assembling the first electronic module and the second electronic module to the body by using the second assembling units, wherein the control unit is electrically connected to the first electronic module and a part of the circuit protection unit, and the second electronic module is electrically connected to the control unit, an electrical connection between the first electronic module and the second electronic module is cut off by the control unit; and assembling the first assembling unit to the circuit protection unit to electrically conduct the circuit protection unit, such that a trigger signal is transmitted to the control unit for the control unit to turn on the electrical connection between the first electronic module and the second electronic module.

In an embodiment of the disclosure, when the circuit protection unit and the first assembling unit are assembled and electrically conducting, the control unit connects to ground through the circuit protection unit and the first assembling unit.

In an embodiment of the disclosure, the first electronic module is a memory module, and the control unit is a write protected terminal disposed on the memory module electrically connected to the circuit protection unit. When the circuit protection unit and the assembling unit are assembled and electrically conducting with each other, the write protected terminal turns on or turns off due to being connected to ground.

In an embodiment of the disclosure, the body includes a first casing and a second casing being assembled to each other or detachable from each other. The first electronic module, the control unit, the circuit board and the circuit protection are disposed at the first casing. The assembly unit is used to fix the first casing and the second casing together. The electronic device further comprises a circuit board disposed at the first casing and a second electronic module disposed at the second casing. When the assembling unit fixes the first casing and the second casing together, the second electronic module is electrically connected to the first electronic module through the assembly unit and the circuit protection unit.

In an embodiment of the disclosure, one of the first electronic module and the second electronic module is a power module.

In an embodiment of the disclosure, the second electronic module is a hot swapping module.

In an embodiment of the disclosure, the first casing has a docking port, the second casing is adapted to accommodate the docking port and be directly assembled with the first casing to comprise the body.

In an embodiment of the disclosure, the circuit protection unit includes a first pad and a second pad disposed separated from each other at the body. The control unit is electrically connected to one of the first pad and the second pad, and the other one of the first pad and the second pad is connected to ground. The assembling unit connects to the first pad and the second pad to electrically conduct the circuit protection unit.

In an embodiment of the disclosure, the assembling unit is a screw used to lock to the body and connect the first pad and the second pad such that the first pad and the second pad are electrically conducted with each other through the screw.

In an embodiment of the disclosure, the body includes a first casing and a second casing detachably attached to each other, one of the first electronic module and the second electronic module is a power module. The assembling method for the electronic device includes, assembling the first electronic module and the second electronic module to the first casing respectively by using the second assembling units; and fixing the first casing and the second casing together by using the first assembling unit, wherein the first assembling unit is assembled to and electrically conducting with the circuit protection unit.

In an embodiment of the disclosure, the body includes a first casing and a second casing detachably attached to each other, the first electronic module is a power module disposed at the first casing, and the second electronic module is a hot swapping module disposed at the second casing. The assembling method for the electronic device includes, assembling the second casing to the first casing by using the second assembling unit, such that the second electronic module is electrically connected to the control module, and the electrical connection between the first electronic module and the second electronic module is cut off by the control unit; and assembling and fixing the first casing and the second casing together by using the first assembling unit, and the first assembling unit is assembled to and electrically conducting with the circuit protection unit such that the control unit turns on the electrical connection between the first electronic module and the second electronic module.

Based on the above, in the electronic device and assembling process thereof, by disposing the circuit protection unit and the assembling unit, the control unit is active or inactive electrically by depending on whether the assembling unit and the circuit protection unit are assembled together or not, such that states of the first electronic module electrically connected to the control unit could be changed by the control unit. In this way, the electrical conduction state of the electronic device may be influenced based on the assembly characteristics of the structure, namely it could be ensured that other components are in a non-conducting state when they are assembled by setting of the assembling unit being the last assembled component in the assembling process, and therefore the risk of the above mentioned live line operation may be effectively prevented.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

FIG. 2 is a schematic diagram illustrating electrical connections of partial components in the electronic device of FIG. 1

FIG. 3 is a flow diagram for assembling an electronic device according to an embodiment of the disclosure.

FIG. 4 is a schematic diagram for assembling an electronic device according to another embodiment of the disclosure.

FIG. 5 is a flow diagram for assembling the electronic device of FIG. 4.

DESCRIPTION OF THE EMBODIMENTS

Figure 1:
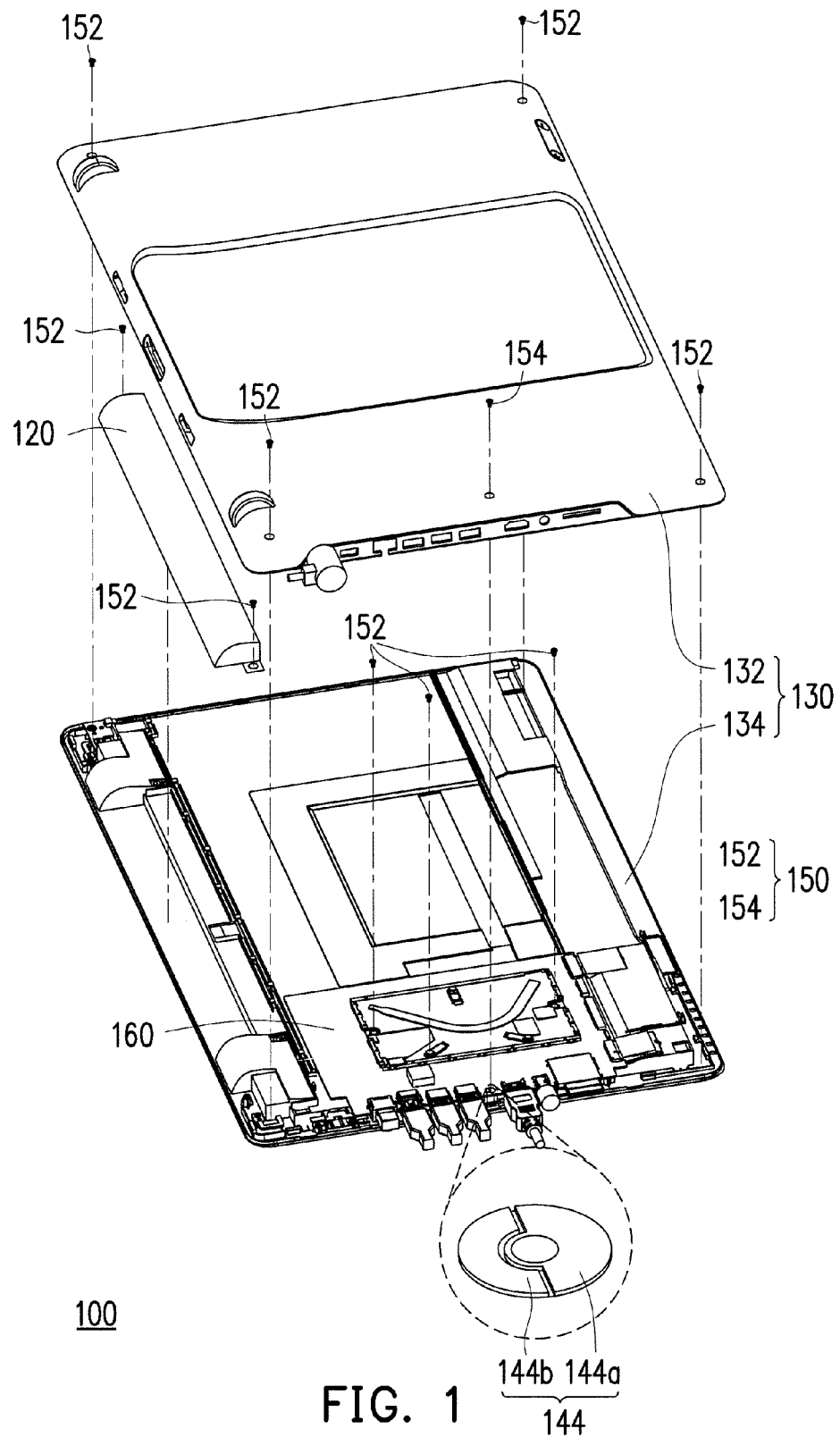
FIG. 1 is a partial enlarged diagram illustrating an electronic device according to an embodiment of the disclosure.

Reference will now be made in detail to the present preferred embodiments of the disclosure, examples of which are illustrated in the accompanying drawings. Wherever possible, the same reference numbers are used in the drawings and the description to refer to the same or like parts.

FIG. 1 is a partial enlarged diagram illustrating an electronic device according to an embodiment of the disclosure. FIG. 2 is a schematic diagram illustrating electrical connections of partial components in the electronic device of FIG. 1. Referring to FIG. 1 and FIG. 2, in the present embodiment, an electronic device 100 for example, is part of a notebook computer. However, the disclosure is not limited thereto and in other embodiments may be a tablet PC and such electronic products. The electronic device 100 includes a first electronic module 110, a second electronic module 120, a body 130, a circuit board 160 and a plurality of assembling units 150. Here, the body 130 is split into a first casing 134 and a second casing 132 that can be assembled together, and the circuit board 160, the first electronic module 110 and the second electronic module 120 are disposed on the first casing 134.

Next, the electronic device 100 further includes a control unit 142 and a circuit protection unit 144, respectively disposed on the circuit board 160. Here, the circuit protection unit 144 includes a first pad 144a and a second pad 144b that are electrically separated from each other (two semi circles shown in the figure), and are disposed on the circuit board 160 inside of the body 130. The control unit 142 is electrically connected with a part of the circuit protection unit 144 (the first pad 144a). The second pad 144b is connected to ground.

The assembling unit 150, for example, is a locking component such as a screw, used to assemble the first electronic module 110 and the second electronic module 120 on to the circuit board 160 or to related structures inside the body 130. After the assembly is completed, that at least one assembling unit 150 is assembled with the circuit protection unit 144 to electrically conduct between the first pad 144a and the second pad 144b, and a trigger signal generated and transmitted to the control unit 142, such that the control unit 142 changes the power status of the first electronic module 110 or the second electronic module 120, or the control unit 142 changes the electrical relationship between the first electronic module 110 and the second electronic module 120. In other words, an electrical connection between the first electronic module 110 and the second electronic module 120 are still shut off even though the first casing 134 and the second casing 132 are structurally assembled because of the assembling unit 150 not assembling or fixing thereto such that the circuit protection unit 144 is not electrical conducted with the assembling unit 150. A notebook computer of FIG. 1 is used as an example, and different embodiments are described according to different relationships of the assembling unit 150, the circuit protection unit 144, and the corresponding electronic modules.

FIG. 3 is a flow diagram for assembling an electronic device according to an embodiment of the disclosure. Referring to FIG. 1, FIG. 2 and FIG. 3, one of the first electronic module 110 and the second electronic module 120 of the electronic device 100 is a power module and the other is related electronic module of the notebook computer different from the first electronic module 120 (in the present embodiment, the second electronic module 120 is the power module). The assembling units 150 are further differentiated into a plurality of second assembling units 152 and at least one first assembling unit 154 for describing the different effects respectively.

In this way, in a step S310 of the assembly process, the second assembling units 152 are used to assemble the first electronic module 110 and the second electronic module 120 to the first casing 134 of the body 130 respectively, such that the first electronic module 110 and the second electronic module 120 are electrically connected to the control unit 142 respectively. The control unit 142 is electrically connected only to one of the pads (the first pad 144a) of the circuit protection unit 144. At this time, the electrical connection between the first electronic module 110 and the second electronic module 120 is actually cut-off by the control unit 142. Next, in a step S320, the first assembling unit 154 is used to assemble and lock the first casing 134 and the second casing 132 together, and the first assembling unit 154 is also locked and attached to the circuit protection unit 144 on the circuit board 160, such that the first pad 144a and the second pad 144b are electrically conducting with each other through the first assembling unit 154. In this way, a trigger signal is generated and transmitted to the control unit 142 as a result of the first pad 144a connecting to ground through the second pad 144b. Therefore, the control unit 142 turns on the electrical connection between the first electronic module 110 and the second electronic module 120 after receiving the above mentioned trigger signal. It can be seen that the control unit 142 could be changed in different states depending on the electrical conduction between the first pad 144a and the second pad 144b.

Bearing on the above, during the assembly process of the electronic device 100, only when the first electronic module 110 and the second electronic module 120 are assembled to the first casing 134, the electrical connection between the first electronic module 110 and the second electronic module 120 will be cut off by the control unit 142 due to the influence from the circuit protection unit 144. Namely, this can be regarded as, the electrical connection between the first electronic module 110 and the second electronic module 120 will be in an electrically disconnected state which is restricted by the circuit protection unit 144. In other words, a production line operator may complete the assembly process of each component under a electrically non-conductive state, and does not need to worry about the dangers of live line operations if the second electronic module 120 (power module) is already installed.

Here, the sequence of installation of the first electronic module 110 and the second electronic module 120 should not be construed as a limitation to step S310. Step S310 actually is only a process for completing the connection of the related structures of the individual components in the electronic device 100.

Furthermore, in the present embodiment, the first assembling unit 154 and the second assembling units 152 both provide locking and fixing function of assembling the first electronic module 110 and the second electronic module 120 to the body 130 or connecting function between the first casing 134 and the second casing 132. And more specifically, the first assembling unit 154 may be further arranged with the circuit protection unit 144 to achieve a function of electrically connecting the first electronic module 110 and the second electronic module 120.

Referring to FIG. 2 again, in the present embodiment, the second pad 144b is in a state connected to ground and the first pad 144a is electrically connected to the control unit 142. In this way, when the above step S320 is executed, the control unit 142 connects to ground via the assembling unit 154 and the circuit protection unit 144, namely the control unit 142 is active by receiving the ground signal accordingly, such that the first electronic module 110 and the second electronic module 120 are in an electrically conducting state. In this way, the second electronic module 120, which is the power module in the present embodiment, may successfully supply power to the first electronic module 110.

Based on the above, the electronic device 100 of the present embodiment uses the control unit 142 and the circuit protection unit 144 as a method for an electrical divider between the first electronic module 110 and the second electronic module 120. The first assembling unit 154 aside from providing a locking function for the first casing 134 and the second casing 132, the first pad 144b and the second pad 144a may also be electrically connected through the first assembling unit 154 at the end of the assembly process, and a successful electrical connection obtained after the related components in the electronic device 100 being structurally completed in the connecting process. Therefore, the risk of live line operations may effectively be avoided, the percentage of good parts may be increased, and the manufacturing cost may be lowered.

FIG. 4 is a schematic diagram for assembling an electronic device according to another embodiment of the disclosure. FIG. 5 is a flow diagram for assembling the electronic device of FIG. 4. Referring to FIG. 4 and FIG. 5, the difference between the present embodiment and the above mentioned embodiment is, an electronic device 200 of the present embodiment includes a body 230, a first electronic module 210 and a second electronic module 220, wherein the first electronic module 210 is a power module, the second electronic module 220 is a hot swapping module, and the first electronic module 210 is structurally and electrically detachably attached to the second electronic module 220 such that the second electronic module 220 performs an expandable function module of the electronic device 200.

In other words, the body 230 of the present embodiment includes a first casing 232 and a second casing 234 that may be assembled together. The first electronic module 210 is disposed at the first casing 232, the second electronic module 220 is disposed at the second casing 234, namely, the first casing 232 and the second casing 234 have a connection and complimentary relationship to each other in structure. More specifically, the first casing 232 of the present embodiment has a docking station 232a, and the second casing 234 is adapted to accommodate the docking station 232a and be assembled directly with the first casing 232 to comprise the body 230. In this way, in a step S510, the second casing 234 is assembled to a first casing 232a first by using a second assembling unit 252, and electrically connecting the second electronic module 220 to a control unit 242, however the electrical connection between the first electronic module 210 and the second electronic module 220 is cut-off by the control unit 242. For example, when a user is assembling a hot swapping module (the second casing 234 and the second electronic module 220 inside thereof) to the first casing 232, even though connectors thereof are in a connected state structurally, the electrical connection between the first electronic module 210 and the second electronic module 220d is still in an electrically disconnected state due to being controlled by the control unit 242. Namely, the main purpose of the step S510 is only to perform the structural assembly process.

After checking the relationship of the above structural connection, a step S520 is performed, namely the first casing 232 is assembled and fixed to the second casing 234 by using the first assembling unit 254, and at the same time, the first assembling unit 254 is assembled to and electrically conducting with the circuit protection unit 244. In this way, after the control unit 242 receives the trigger signal produced due to the electrical conduction, the electrical connection between the first electronic module 210 and the second electronic module 220 is turned on. In other words, by assembling the circuit protection unit 244 with the first assembling unit 254, a first pad 244a and a second pad 244b are electrically conducted through the first assembling unit 254. Namely, the control unit 242 connects to ground through the second pad 244b, the first assembling unit 254 and the first casing 244a to achieve the effect of transmitting the trigger signal to the control unit 242 (namely, connecting the control unit 242 to ground), and change the state of the control unit 242, such that the first electronic module 210 successfully supply power to the second electronic module 220. Here, the first assembling unit 254 provides a structural (the first casing 232 and the second casing 234) and an electrical (the first electronic module 210 and the second electronic module 220) connecting functions, and the assembly is performed after the first casing 232 and the second casing 234 being assembled completed, namely the first assembling unit 254 becomes the last component in the assembly process.

Figure 6:
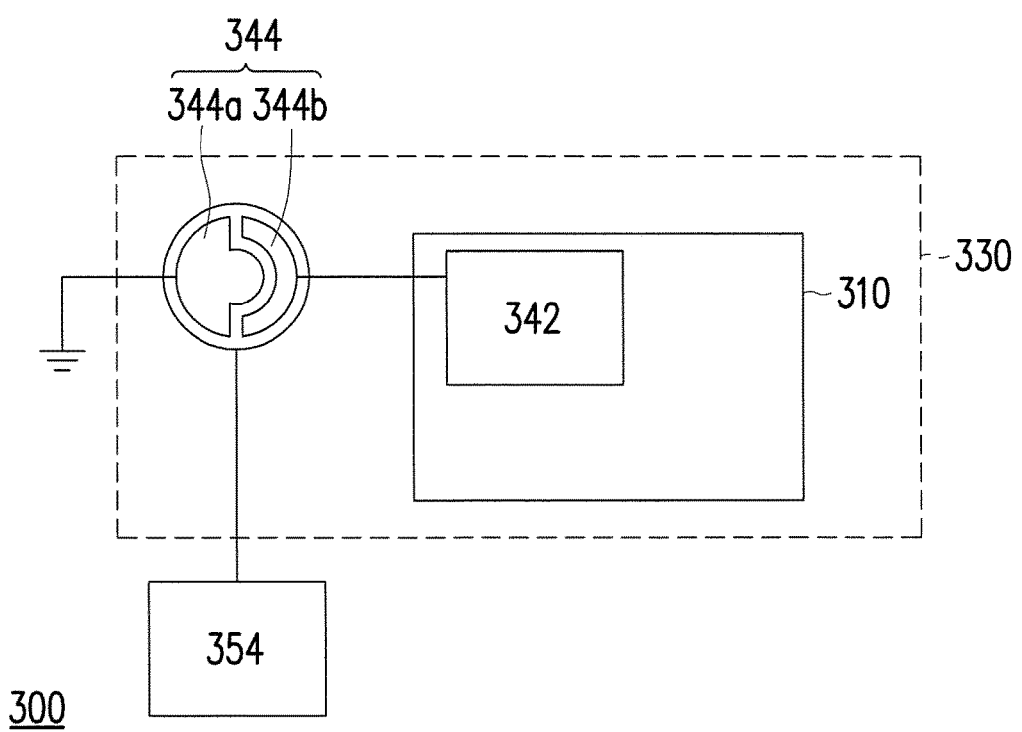
FIG. 6 is a schematic diagram illustrating electrical connections of an electronic device according to another embodiment of the disclosure.

FIG. 6 is a schematic diagram illustrating electrical connections of an electronic device according to another embodiment of the disclosure. Referring to FIG. 6, the difference with the above mentioned embodiments is, an electronic device 300 includes a first electronic module 310, a body 330, a control unit 342 and a circuit protection unit 344, wherein the first electronic module 310, for example, is an EEPROM disposed in the body 330, the control unit 342 is a write protected terminal disposed at the first electronic module 310, and the circuit protection unit 344 is similar to the above and namely includes a first pad 344a and a second pad 344b, wherein the first pad 344a is connected to ground, and the second pad 344b is electrically connected to the control unit 342. Furthermore, the electronic device 300 further includes an assembling unit 354, similar to the above mentioned screw, and is used to detachably attach to the body 330. When the assembling unit 354 is assembled to the body 330, the assembling unit 354 also contacts the first pad 344a and the second pad 344b, such that the first pad 344a and the second pad 344b are electrically conducted through the assembling unit 354.

In this way, activation of the write protected terminal depends on whether the assembling unit 354 is assembled with the circuit protection unit 344 or. For example, when the electronic device 300 is used by an end user, the assembling unit 354 and the circuit protection unit 344 are assembled with each other, such that the control unit 342 (write protected terminal) is connected to ground so as to turn on the write protected terminal to deny any writing operation to the EEPROM.

Oppositely, when editing is performed on the information in the EEPROM during maintenance on the electronic device 300, the assembling unit 354 is dismounted from the body 330 so as to electrically disconnect the circuit protection unit 344 (namely the write protected terminal is in a state of not connected to ground), therefore the write protect function of the write protected terminal may be turned off. However, in another embodiment not illustrated, the write protected terminal may also turn off the write protect function by the assembling unit and the circuit protection unit being assembled together, and the circuit protection unit may turn on its write protect function after the assembling unit being removed therefrom. In other words, any assembly or detaching and such structural movement between the circuit protection unit and the assembling unit may be adapted for the disclosure to achieve turning on or turning off electricity to the control unit.

In summary, in the above embodiments of the disclosure, a first electronic module may be controlled to change a state thereof by arranging a circuit protection unit and an assembling unit with each other. Similarly, the circuit protection unit may be used as a connection node between the first electronic module and a second electronic module, and also use whether the assembling unit is assembled with a circuit protection unit of the circuit protection unit as a basis for whether to electrically conduct the first electronic module and the second electronic module. In this way, the sequence of assembly of the components structurally may be used as method for whether to electrically conduct, namely by the assembling unit being the last assembled component in the assembling process, may ensure that the other components are in a electrically non conducting state when they are assembled up until then, and therefore may effectively prevent the risk of the above mentioned live line operation. Furthermore, similarly the circuit protection unit and the assembling unit may be adapted for a memory module (EEPROM, for example), and the assembling relationship of the assembling unit and the circuit protection unit with each other may be used as a basis for whether allowing the internal data of the memory module to be edited. Thus the electronic device and the structural characteristics thereof may further achieve the effect of influencing electrical characteristics.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims and their equivalents.

What is claimed is:

1. An electronic device with circuit protection, comprising:
    a body;
    a first electronic module, disposed at the body;
    a control unit, disposed at the body and electrically connected to the first electronic module;
    a circuit protection unit, disposed at the body and electrically connected to the control unit;
    an assembling unit, implemented as an electrically conductive screw which is physically and electrically connected to and detachably assembled onto the circuit protection unit of the body, to provide a trigger signal to the control unit, for the control unit to change a state of the first electronic module; and
    a circuit board, wherein the circuit protection unit comprises a first pad and a second pad, disposed separated from each other on the circuit board such to form an electrical break, the control unit is electrically connected to one of the first pad and the second pad, and the other one of the first pad and the second pad is connected to ground, and the assembling unit connects to the first pad and the second pad such that the first pad, the second pad and the assembling unit are electrically conducted with each other.

2. The electronic device as claimed in claim 1, wherein the first electronic module is a memory module, and the control unit is a write protected terminal disposed on the memory module electrically connected to the circuit protection unit, and when the circuit protection unit and the assembling unit are assembled and electrically conducting together, the write protected terminal turns on or turns off due to being connected to ground.

3. The electronic device as claimed in claim 1, wherein the body comprises a first casing and a second casing being assembled to or detachable from each other, the first electronic module, the control unit, the circuit board and the circuit protection unit thereof are disposed at the first casing, and the assembly unit is used to assemble and fix the first casing and the second casing, the electronic device further comprising:
 a second electronic module, electrically connected to the control unit, when the assembling unit is not assembled nor fixing the first casing and the second casing together, the control unit turns off an electrical connection between the first electronic module and the second electronic module, and when the assembling unit fixes the first casing and the second casing together and the assembling unit connects and electrically conducts the circuit protection unit, the control unit turns on the electrical connection between the first electronic module and the second electronic module.

4. The electronic device as claimed in claim 3, wherein one of the first electronic module and the second electronic module is a power module.

5. The electronic device as claimed in claim 3, wherein the first electronic module is a power module and the second electronic module is a hot swapping module.

6. The electronic device as claimed in claim 5, wherein the first casing has a docking port, the second casing is adapted to accommodate the docking port and directly assembled with the first casing to comprise the body.

7. The electronic device as claimed in claim 5, wherein the second electronic module is disposed at the second casing, and electrically connects to the control unit while the second casing being assembled to the first casing.

8. The electronic device as claimed in claim 1, wherein the assembling unit is a screw, used to lock to the body and contact the first pad and the second pad such that the first pad and the second pad are electrically conducted through the screw.

9. An assembling method for an electronic device with circuit protection, the electronic device comprising a body, a first electronic module, a second electronic module, a first assembling unit, a plurality of second assembling units, a control unit and a circuit protection unit, the method for assembling the electronic device comprising:
 assembling the first electronic module and the second electronic module to the body by the second assembling units, wherein the control unit is electrically connected to the first electronic module and a part of the circuit protection unit, and the second electronic module is electrically connected to the control unit, an electrical connection between the first electronic module and the second electronic module is cut off by the control unit; and
 assembling the first assembling unit to the circuit protection unit such that the circuit protection unit is electrically conducting thereby, and a trigger signal is transmitted to the control unit for the control unit to turn on the electrical connection between the first electronic module and the second electronic module.

10. The assembling method for an electronic device as claimed in claim 9, wherein when the circuit protection unit and the first assembling unit are assembled and electrically conducting with each other, the control unit connects to ground through the circuit protection unit and the first assembling unit.

11. The assembling method for an electronic device as claimed in claim 9, wherein the body comprises a first casing and a second casing detachably attached to each other, one of the first electronic module and the second electronic module is a power module, the assembling method for the electronic device comprising:
 assembling the first electronic module and the second electronic module to the first casing respectively by the second assembling units; and
 fixing the first casing and the second casing together by the first assembling unit, such that the first assembling unit is assembled and electrically conducting to the circuit protection unit.

12. The assembling method for an electronic device as claimed in claim 9, wherein the body comprises a first casing and a second casing detachably attached to each other, the first electronic module is a power module disposed at the first casing, the second electronic module is a hot swapping module disposed at the second casing, the assembling method for the electronic device comprising:
 assembling the second casing to the first casing by the second assembling unit, such that the second electronic module is electrically connected to the control module, and the electrical connection between the first electronic module and the second electronic module is cut off by the control unit; and
 assembling and fixing the first casing and the second casing by the first assembling unit, and the first assembling unit is assembled and electrically conducting to the circuit protection unit such that the circuit protection unit turns on the electrical connection between the first electronic module and the second electronic module.

13. The assembling method for an electronic device as claimed in claim 9, wherein the electronic device further comprises a circuit board disposed in the body, the circuit protection unit comprises a first pad and a second pad disposed separated from each other on the circuit board, the control unit is electrically connected to one of the first pad and the second pad, and the other one of the first pad and the second pad is connected to ground, and the assembling unit is electrically conducting with the circuit protection unit by contacting to the first pad and the second pad.

14. The assembling method for an electronic device as claimed in claim 13, wherein the first assembling unit is a screw used to lock to the body and connect to the first pad and the second pad, such that the first pad and the second pad are electrically conducted through the screw.

* * * * *